Nov. 5, 1963          W. W. MOE          3,109,888

SCANNING MECHANISM FOR FACSIMILE REPRODUCTION SYSTEM

Filed Oct. 14, 1960          2 Sheets-Sheet 1

INVENTOR.
WILLIAM WEST MOE

BY Brumbaugh, Free, Graves
         & Donahue his     ATTORNEYS

Nov. 5, 1963    W. W. MOE    3,109,888
SCANNING MECHANISM FOR FACSIMILE REPRODUCTION SYSTEM
Filed Oct. 14, 1960    2 Sheets-Sheet 2

INVENTOR.
WILLIAM WEST MOE

BY Brumbaugh, Free, Graves
& Donohue his    ATTORNEYS

3,109,888
SCANNING MECHANISM FOR FACSIMILE REPRODUCTION SYSTEM
William West Moe, Stratford, Conn., assignor to Time, Incorporated, New York, N.Y., a corporation of New York
Filed Oct. 14, 1960, Ser. No. 62,643
11 Claims. (Cl. 178—6.7)

This invention relates generally to a facsimile reproduction system in which a visual subject on a sheet is scanned by an aperture of the system so that variations in the tone density of the subject are translated into electrical signal variations which modulate the intensity of a light beam, and in which such light beam falls on a photo-sensitive sheet mounted on a rotating drum to reproduce the subject on the last-named sheet. More particularly, this invention relates to an improvement in such system for obtaining scanning of the visual subject by the aperture.

In facsimile reproduction systems of the sort described, it has been previously customary for the sheet bearing the visual subject and the photo-sensitive sheet to be separately mounted on first and second coaxial drums which are rotated by a common shaft.

I have found, however, that, in the instance where it is desired to produce an enlarged copy of the original subject, a conventional system of this sort is disadvantageous in a number of respects as follows. First a rather complicated arrangement is required to produce the necessary greater-lesser relation between the axial movement of the reproducing light beam over the photo-sensitive sheet and the axial movement of the scanning light beam over the original. Second, if, as is often the case, it is sought to enlarge a 35 mm. six times to produce a 6" x 8" copy on a photosensitive sheet mounted on a standard diameter drum, it would be necessary in the conventional system to mount the original on a drum which has an outside diameter of only 0.63 inch, and which, accordingly, is too small in diameter to permit the placing inside that drum of a satisfactory light source for illuminating the original subject. Third, the placing of the original upon the glass surface of the drum tends to create Newton's rings which adversely affect the appearance of the reproduced copy. Finally, the small diameter glass cylindrical drum for supporting the original results in the production of various optical aberrations in the optical scanning system.

It is, accordingly, an object of my invention to provide a facsimile reproduction system of the above described character which is free of one or more of the aforementioned disadvantages. Other objects of my invention are, while reducing such distortions, to obtain scanning of the original subject, in a manner suitable for reproduction thereof on a larger scale, and to maintain exact synchronism between the scanning motions over the subject of the scanning aperture and the motions over the photo-sensitive sheet of the reproducing light beam.

These and other objects are realized according to the invention by providing a frame or other means to mount the sheet bearing the original subject in the field of view of the scanning aperture, and to impart by such frame to such sheet a curvature such that the subject subtends a lesser angle of arc than that of the photocopy reproduced therefrom in the direction over which each is swept a line at a time by, respectively, the scanning aperture and the reproducing light beam. At the limit, such curvature may have a value of zero. In other words, the original subject may be planar so as to have an infinitely large radius of curvature, and so as to subtend an infinitesimally small angle of arc. Ordinarily, however, I have found it more convenient for the sheet bearing the original subject to be curved by the frame into the form of an arcuate section of a cylindrical surface.

In order to produce a scanning of the original subject by the scanning aperture, the mentioned frame and the sheet mounted thereby are moved longitudinally relative to the aperture (to produce a scanning a line at a time of the subject) and, also, in a transverse direction relative to the aperture (to space apart successively scanned lines of the subject) so as to render the subject scanned in a pattern of the same shape as that followed in the facsimile reproduction system by the reproducing light beam in the course of sweeping over the photocopy area. The invention hereof is particularly advantageous when the size of the original subject and the scanning pattern therefor are smaller than the reproduced photocopy and the pattern of motions by which the mentioned light beam reproduces such photocopy. However, the invention can also be used when the sizes of the subject and photocopy are the same, or when the size of the subject exceeds the size of the photocopy.

When, as described, the subject being scanned subtends a lesser angle of arc than the photocopy reproduced therefrom it is evident that, to render equal the time intervals over which the subject is scanned by the aperture and the photocopy is traversed by the reproducing light beam, the motion of the subject under the aperture must occur at a slower angular rate than the motion under the light beam of the photo-sensitive sheet on which the photocopy is being reproduced. This relationship between the angular rates of movement employed in scanning and in reproduction, can be satisfactorily obtained by imparting to the mentioned frame and to the subject mounted thereby a reciprocating motion which is such that on, say, the forward stroke, the linear rate at which the subject moves under the aperture and the linear rate at which the photo-sensitive sheet moves under the light beam, bear the same direct, instantaneous proportional relation to each other as the distance scanned in one scanning by the aperture over the subject bears to the distance swept in one sweeping by the reproducing light beam over the photocopy. Simultaneously with the described reciprocation which is imparted to the frame, there is also imparted thereto a transverse motion i.e., a motion normal to the direction of reciprocation, which bears the same proportional relation to the relative axial motion of the reproducing light beam and the rotating drum as the linear rate of sweeping of the subject under the aperture bears to the linear rate of sweeping of the photo-sensitive sheet under the reproducing light beam. In this manner, the scanning pattern of the aperture over the original subject is rendered the same in shape as the pattern of the motions of the reproducing light beam over the photo-sensitive sheet.

The mentioned reciprocating and transverse motions of the frame may be separately imparted thereto by first and second driving means which are operable in synchronism with, respectively, the rotation of the drum and the axial movement thereof relative to the reproducing light beam. While I do not exclude the possibility of using gears or the like as motion transmitting elements in one or both of such driving means, to avoid back lash and non-repetitive motions, I have found it desirable that each such driving means be in the nature of bar linkages or other devices which omit gears and which, therefore, are free of the inherent inaccuracies characterizing the transmission of motion through gear couplings.

While the invention hereof is applicable to black and white facsimile reproduction systems, it was developed as an improvement in a multi-color reproduction system and, hence, it will be described in connection with a system of the multi-color type.

For a better understanding of the invention, reference is made to the following description of an exemplary embodiment thereof, and to the accompanying drawings wherein.

Figure 1:
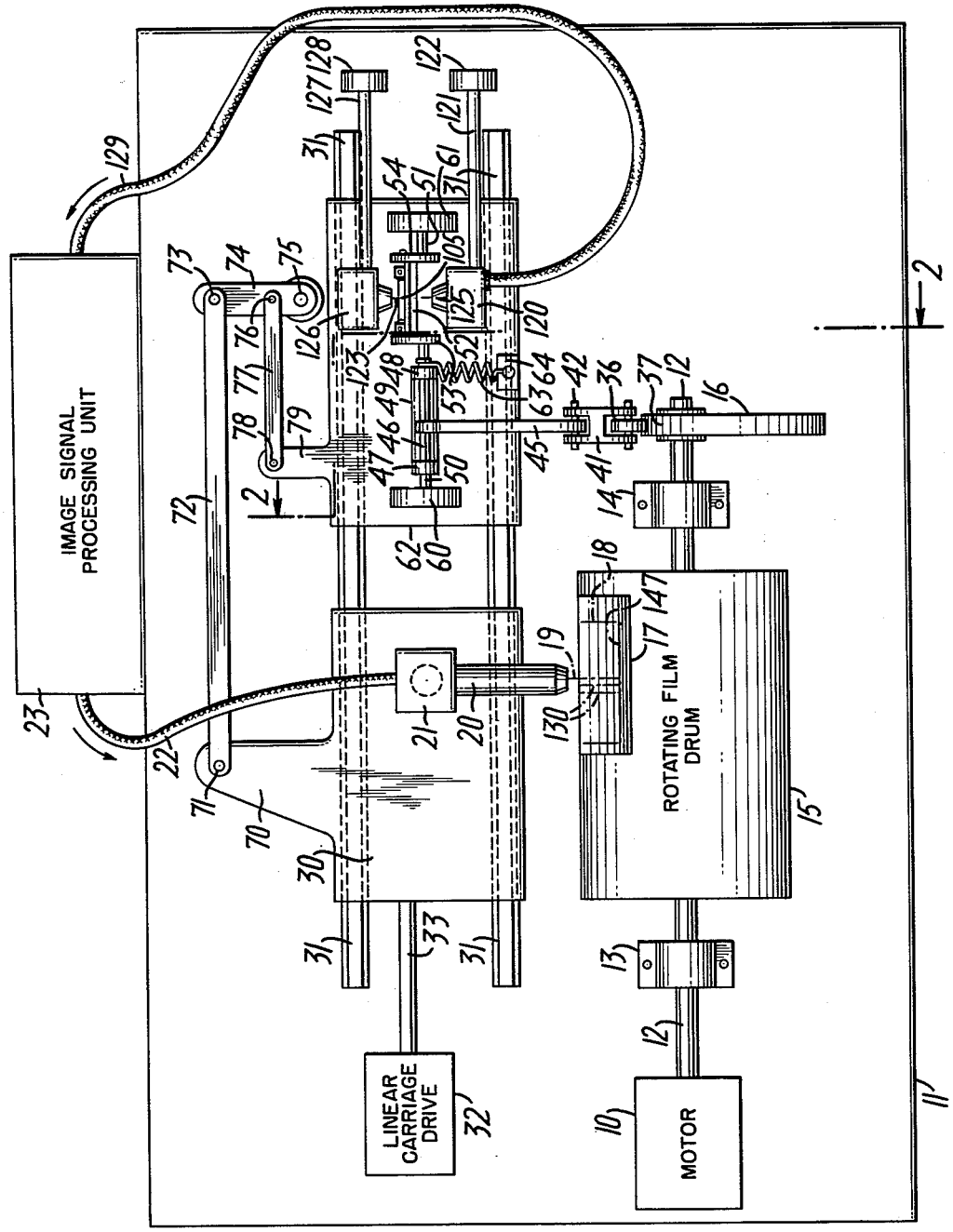
FIGURE 1 is a plan view of the exemplary embodiment.

Referring now to FIGURE 1, a constant speed electric motor 10 on a base 11 is connected to a shaft 12 journaled in bearings 13 and 14. The shaft 12 carries a drum 15 and a cam 16 of which each is fixedly secured to the shaft to be rotated thereby when the shaft is driven by the motor 10.

The drum 15 is shown as having mounted thereon a sheet 17 of photographic film from which is produced one of the separation transparencies utilized in making a color print. The sheet 17 is adapted to have a photocopy 18 of a scanned subject exposed thereon by a variable intensity light beam 19 directed onto sheet 18 by an optical projector unit 20. Such light beam is derived from a glow-lamp 21 disposed within unit 20 and electrically connected through a cable 22 to the output of an electronic image signal processing unit 23.

The unit 23 may be similar to or the same as the electronic section of the facsimile reproduction system disclosed in my U.S. patent, No. 2,873,312 (February 10, 1959). Such patented system is a four-color reproduction system in which four optical projector units like unit 20 are controlled by separate electric signals to expose "yellow," "magenta," "cyan" and "black" separation transparencies for a color-print on four photo-sensitive sheets disposed in line along drum 15 in the manner shown in U.S. patent, No. 2,744,950 issued on May 8, 1956, in the name of Hall et al. For convenience, however, only one of those projectors and the photo-sensitive sheet associated therewith are depicted in FIGURE 1.

The projector 20 is mounted on a carriage 30 slidable on ways 31 extending in a direction parallel to the axis of the drum 15. Connected to the carriage 30 for the purpose of giving it a step by step axial displacement from left to right in FIGURE 1 is a linear drive means which is shown schematically in the figure as being in the form of a drive unit 32 and a drive lever 33, but which in practice may be a drive mechanism of the type disclosed in U.S. Patent No. 2,778,232, issued January 22, 1957 to R. P. Mork.

Figure 2:
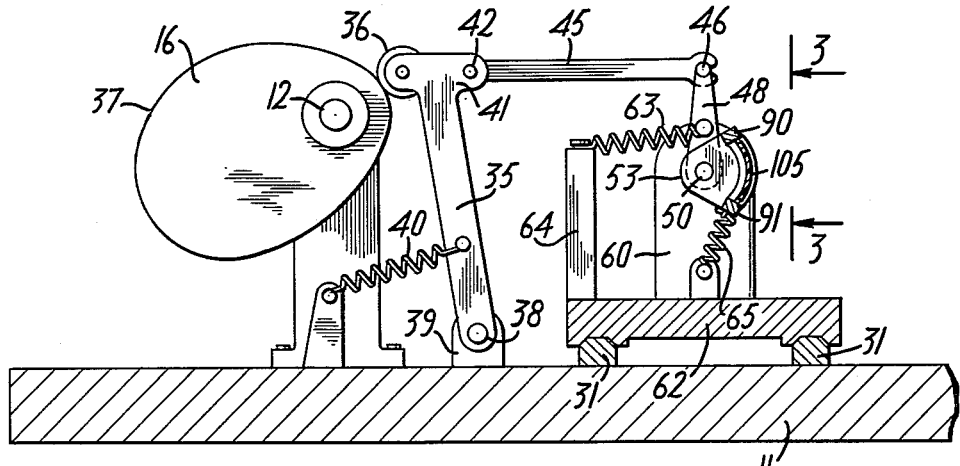
FIGURE 2 is a side view (partly in cross-section) of the FIGURE 1 embodiment, the view being taken as indicated by the arrows 2—2 in FIGURE 1.

Considering now the scanning mechanism, a cam follower bar 35 (FIG. 2) has at its top a cam contacting projection 36 which abuts the camming surface 37 of the cam 16 to cause the rotating cam to oscillate the bar 35 back and forth about a pivot pin 38, supporting the bar (through a mounting 39) from the base 11. Opposite the projection 36 the bar 35 has formed therein a clevis 41 (FIG. 1) through which passes a horizontal clevis pin 42 providing a pivot for the rear end of a push bar 45. The front end of such push bar is forked to ordinarily bear without vertical slippage against a slide bar 46 extending transversely of the push bar.

The slide bar 46 is supported at its two ends by a pair of arms 47, 48 extending downwardly to a sleeve 49 fitted on a left hand shaft section 50 so that such shaft section rotates with the sleeve. This left hand shaft section 50 is connected to a coaxial right hand shaft section 51 through a frame 52 (to be later described in further detail) and a pair of sector plates 53, 54 disposed at transversely opposite ends of the frame 52 to hold it parallel to but offset from the common axis of the shaft sections 50 and 51. The elements 46–54 form a structure which as a whole is rotatable about the axis of the shaft sections 50, 51 when the cam 16 operates through the cam follower rod 35 and the push bar 45 to rock the slide bar 46 back and forth.

To permit such rotation, the left and right hand ends of, respectively, the shaft sections 50 and 51 are journaled in bearings contained in blocks 60 and 61 mounted on a carriage 62 which is slidable on the same ways 31 as the carriage 30. The carriage 62 also carries (a) a tension spring 63 having opposite ends connected to, respectively, the arm 48 and a post 64 outstanding from the carriage, and (b) a direction reversing spring 65 adapted to bear against the lower face of the sector plate 53 as such plate approaches the downward limit of its travel in the course of the rocking of the slide bar 46. As will be evident, the rocking of such slide bar causes the frame 52 to reciprocate back and forth through an angle about the axis of the shaft sections 50, 51.

The carriage 62 for the frame 52 is moved along the ways 31 in a manner as follows. The carriage 30 has thereon a bracket 70 supporting a vertical pin 71 acting as a pivot for one end of a long lever arm 72. The other end of arm 72 is pivotally connected through a vertical pin 73 to the free end of an angularly movable arm 74 of which the held end is pivotally connected through vertical pin 75 with the base 11. An intermediate point on the arm 74 is pivotally connected through a vertical pin 76 with one end of a short lever arm 77 of which the other end is pivotally connected through a pin 78 with a bracket 79 on the carriage 62. The arms 72, 74 and 77 form a sine bar linkage by which movement of carriage 30 along ways 31 is converted into a directly proportional but lesser movement of carriage 62 along those same ways. For example, the linkage may be so designed that each unit displacement of carriage 30 produces a displacement of ⅓ unit of the carriage 62.

Figure 3:
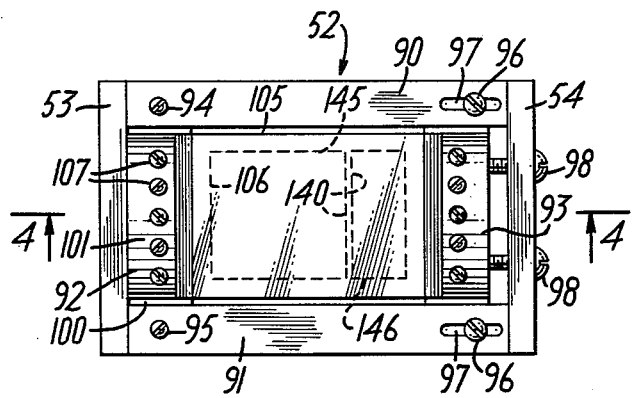
FIGURE 3 is an enlarged rear elevation (taken as indicated by arrows 3—3 in FIGURE 2) of the sheet bearing the visual subject to be reproduced, and of the mounting frame for such sheet.

Referring now to FIGURE 3, the frame 52 includes two horizontal support bars 90 and 91 which are spaced vertically (i.e. longitudinally) from each other, and which both extend between the sector plates 53 and 54 to each be connected at its opposite ends with opposite ones of the sector plates. Extending between those support members are two side members 92 and 93 which are spaced horizontally (i.e. transversely) from each other, and of which the opposite ends of each are in abutment with the back sides of, respectively, the member 90 and the member 91. While the left hand side member 92 is fixedly secured to the horizontal support members 90, 91 by the fastening screws 94, 95, the right hand side member 93 is secured to the mentioned support members 90, 91 by screws 96 which pass through horizontal slots 97 formed in the members 90, 91 to permit adjustment in the horizontal (transverse) position of element 93 upon loosening of the last named screws. Such adjustment is accomplished by a pair of horizontal set screws 98 which pass through unthreaded holes in the right hand sector plate 54 to be received in threaded holes in the side member 93.

Figure 4:
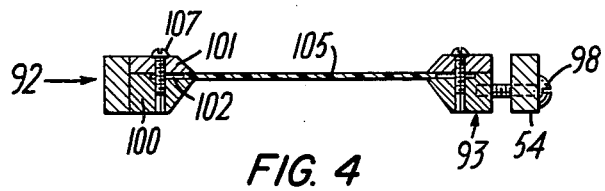
FIGURE 4 is a cross-sectional view (taken as indicated by the arrows 4—4 in FIGURE 3) of the frame and sheet shown in FIGURE 3.

As shown by FIGURE 4, the left hand side member 92 is comprised of a back piece 100 and a front piece 101 of which both are of arcuate form (FIG. 2) in a plane normal to that of the FIGURE 4 drawing to provide between pieces 100 and 101 an interface 102 in the form of an arc of a circle centered on the axis of shaft sections 50, 51. Such interface 102 is shown as having received therein the left-hand edge of a rectangular sheet 105 bearing the original subject 106 to be scanned. In the presently described embodiment, such subject is a 35 mm. color transparency having a rectangular shape (as indicated by its dotted outline) and having for each margin a length which is one-third that of the corresponding margin (FIG. 1) of the photocopy 18 reproduced therefrom.

The sheet 105 is clamped at its left-hand edge within the interface 102 in side member 92 by a plurality of screws 107 which pass through unthreaded holes in front piece 101 and in the left-hand margin of the sheet and, thereafter, into threaded holes in the back piece 100 to thereby be adapted to draw together the front and back pieces 101, 100 when the screws 107 are tightened. The right-hand edge of the sheet 105 is clamped in like manner by side member 93 which has front and back pieces and clamping screws similar to those of side member 92. After the sheet 105 has been gripped by each of side members 92, 93 it is stretched between those side members by turning in the appropriate direction of the screws 98.

When so stretched, the sheet 105 is shaped to conform very closely to a geometrically perfect circular cylindrical surface of which the axis coincides with that of the shaft sections 50, 51.

The vertical (longitudinal) extent on curved sheet 105 of the subject 106 subtends less of an angle of arc than the circumferential extent on photo-sensitive sheet 17 (FIG. 1) of the photocopy 18 reproduced from that subject. Thus, for example, the subject may subtend an angle of arc of only 2°, whereas, on the other hand, the photocopy reproduced from the subject may subtend an angle of arc of 10°. While it does not necessarily follow from the lesser-greater relation between the angles of arc respectively subtended by the subject 106 and the photocopy 18 that the sheet 105 must also subtend a lesser angle of arc than the photosensitive sheet 17 (i.e., sheet 105 might have a superfluously large vertical extent relative to that of subject 106), it does necessarily follow from such relation that, when both of the mounted curved sheets 17 and 105 are of constant curvature (as they always are), the angle of arc per unit length of arc subtended by sheet 105 is less than the angle of arc per unit length of arc subtended by the sheet 17. This same lesser-greater relationship value also holds between the angle of arc per unit length of arc longitudinally subtended by frame 52 and the angle of arc per unit length of arc subtended by the cylindrical surface of the drum 15.

For scanning purposes, an optical projector 126 is mounted by an arm 127 and a stand 128 from base 11 and is disposed on the convex side of curved sheet 105 to direct a light beam 123 of very small cross sectional area through the color transparency 106 on sheet 105. Such beam passes through the transparency and into an aperture 125 for a scanning head 120 which, like projector 126, is mounted by an arm 121 and a stand 122 from the base 11, and which may have a construction as disclosed in the aforementioned U.S. Patent 2,744,950. The scanning head 120 derives from the beam passing through aperture 125 a plurality of electric signals representing separate color components of a color tone detected by the beam in the transparency. From the head 120, the several color component signals are transmitted via cable 129 to the input of the previously described image signal processing unit 23.

The operation of the described embodiment is as follows. As a preliminary to a scanning operation, the rotatable structure comprised of elements 46–54 is rotated counterclockwise (FIG. 2) by hand against the tension of spring 63 to disconnect the front forked end of push bar 45 from the slide bar 46. This disconnection permits the frame 52 to be rotated clockwise by hand to an upward facing position. With frame 52 so facing, any old sheet on the frame is removed, and a new sheet 105 is clamped and stretched in the frame in the manner heretofore described. The mentioned structure is then rerotated counterclockwise and next clockwise to re-engage the slide bar 46 with the push bar 45. Once such re-engagement is made, the engagement between the slide and push bars is maintained by spring 63, and the apparatus is fully set up for scanning.

During a scanning operation, the motor 10 rotates drum 15 at constant speed while the linear carriage drive 32 advances the carriage 30 and the projector 20 mounted thereon in the rightward direction and in a step by step manner until the light beam 19 from the projector is axially opposite the photocopy area 18 of the photosensitive film 17 mounted on the drum. Thereafter, each rotation of the drum causes the reproducing light beam 19 to make one straight line sweep over the arc occupied around the drum circumference by the photocopy area 18. In-between each such sweep, the carriage 30 is displaced to the right by a unit step. Thus, the combination of the rotational motion of drum 15 and the relative axial motion between such drum and the light beam 19 causes that light beam to sweep over the photocopy area 18 in a succession of axially separated parallel lines 130 which may have a spacing of, say, 1,000 lines to the inch.

While the light beam 19 is so sweeping over the photocopy area, the cam 16 (FIG. 2) operates through cam follower bar 35 and push bar 45 to rock slide bar 46 rightwardly on the forward stroke to thereby impart a forward (counterclockwise) motion to the frame 52 and to the sheet 105 mounted thereon. Shortly before the frame 52 reaches its forward limit of travel, the sector plate 53 of the moving linkage bears against the direction reversing spring 65 to compress the spring to thereby store energy therein. Once frame 52 has reached its forward-most position (as determined by the camming surface 37 of the cam 16), the direction of motion of the moving linkage is reversed, primarily by the action of tension spring 63 which continuously urges the frame 52 to move clockwise. During the initial part of the motion on the return stroke of the linkage, the energy previously stored in spring 65 is given up to the linkage to accelerate its motion in the return direction.

The return stroke is like the forward stroke in that, shortly before the moving linkage reaches its return limit of travel (as determined by the mentioned camming surface), the cam follower bar 35 bears against the direction reversing spring 40 to compress such spring to thereby store energy therein. When the return limit of travel has been reached the cycle begins over again with the cam 16 driving the cam follower bar 35 leftwardly on a new forward stroke, and with the spring 40 giving up the energy previously stored therein to the moving linkage during the initial part of that new forward stroke.

In connection with the above, it will be noted that, because of the bar structure of the moving linkage, and because the spring 63 maintains all mutually coupled parts in constant contact, no back lash or play occurs in the linkage during its forward stroke or its return stroke or during the times when the linkage changes the direction of its stroke. Furthermore, because of the action of the direction reversing springs 40 and 65, the loading on the cam caused by the changes in the direction of motion of the mass of the moving linkage at its limits of travel is a loading which is substantially lessened from what it would be if such direction reversing springs were not present. Hence, those springs serve to minimize the transitory variations in the angular velocity of drum 15 which tend to be induced by such loading.

As is evident from the previous description, the movement of the frame 52 is synchronized with the rotation of drum 15 so that, for each revolution of the drum, the frame 52 undergoes one complete longitudinal reciprocation consisting of a forward motion and a following return motion. The synchronization relation is such that the forward motion of the frame takes place while the light beam 19 is sweeping over the photocopy area 18 of the sheet 17 mounted on the drum, the return motion of the frame occurring while the beam 19 is sweeping over a blank area of the drum.

Simultaneously with the reciprocations undergone by frame 52, the described step by step advancement of carriage 30 operates through sine bar linkage 72, 74, 77 to advance carriage 62 step by step from left to right to thereby produce a right to left step by step (transverse) movement of the aperture 125 relative to the subject 106 on the sheet 105 carried by the frame. Because of the lost motion coupling between push bar 45 and slide bar 46, the step by step advancement of carriage 62 takes place without interruption in the communication of motion from the axially stationary cam 16 to the frame 52 on the moving carriage.

The combination of the reciprocation of the frame 52 under aperture 125 and the right to left step by step movement of that aperture relative to the frame produces a scanning by the aperture over the subject 106 in the same pattern as the pattern of motions of the reproducing light beam 19 over the area of the photocopy 18 reproduced from the subject. Specifically, each time the frame 52 travels through the forward stroke of its reciprocation, the aperture 125 scans in one direction in a line over the vertical (longitudinal) extent of the subject 106, and each time the frame 52 travels through the return stroke of its reciprocation, the aperture 125 moves to the left (transversely) by one step within the period of the return stroke. Thus, the aperture 125 is caused to scan in one direction of longitudinal travel over the subject 106 in each of a succession of transversely spaced parallel lines 140 which may have a spacing of, say, 3,000 to the inch. While the aperture 125 scans the subject 106 during the return motions of the frame 52 as well as during the forward motions thereof, such scannings during the frame return motions have no effect on the reproduced photocopy because of the fact that the return motion scanning occurs at a time when the reproducing light beam 19 is traversing a blank sector of the circumference of the drum 15. In order to render the scanning pattern of aperture 125 over subject 106 an exact duplicate (except for scale) of the pattern of motions of beam 19 over the photocopy area 18, the described embodiment operates so that (1), as the aperture scans over the subject and the beam sweeps over the photocopy area, the ratio of the linear rate of scanning of the aperture over the surface bearing the subject to the linear rate of sweeping of the beam over the surface of the photocopy area is a ratio which remains constant in value throughout a subject scanning period, and (2) the same constant value characterizes the ratio of the size of each transverse step undergone by carriage 62 to the size of each transverse step undergone by carriage 30. In this manner, the subject is reproduced in exact proportions in both dimensions in the photocopy despite the fact that the angular rate of scanning of the subject is slower than the angular rate of sweeping of the reproducing light beam over the photocopy area.

The above-described embodiment being exemplary only, it will be understood that the invention hereof comprehends embodiment differing in form and/or detail from that specifically disclosed. Accordingly, the invention is not to be considered as limited save as is consonant with the scope of the following claims.

I claim:

1. In a facsimile system in which a visual subject on a sheet is scanned by an aperture to thereafter be reproduced by a variable intensity light beam as photocopy on photosensitive film mounted on a drum which rotates and axially moves relative to said beam to produce by said rotation a sweeping by said beam over said film a line at a time, and to produce by said relative axial movement an axial motion of said beam over said film so as to space apart successive ones of said sweepings the improvement comprising, a frame adapted to mount said sheet in the field of view of said aperture, said frame being mounted independently of said drum to be movable relative thereto in directions longitudinal of and transverse of said aperture, first frame-driving means operable synchronously with the rotation of said drum to reciprocate said frame and mounted sheet longitudinally of said aperture to produce a scanning motion thereby over said subject a line at a time said scanning motion corresponding to the sweeping motion of said beam over said film, and second frame-driving means operable synchronously with said relative axial motion to move said frame and mounted sheet transversely of said aperture in correspondence with the axial motion of said beam over said film.

2. In a facsimile system in which a visual subject on a sheet is scanned by an aperture to thereafter be reproduced by a variable intensity light beam as photocopy on photosensitive film mounted on a drum which rotates and axially moves relative to said beam to produce by said rotation a sweeping by said beam over said film a line at a time, and to produce by said relative axial movement an axial motion of said beam over said film so as to space apart successive ones of said sweepings, the improvement comprising, a frame adapted to mount in the field of view of said aperture a sheet having thereon a visual subject to be reproduced to a larger scale as photocopy on said film, said frame being mounted independently of said drum to be movable relative thereto in directions longitudinal of and transverse of said aperture, first frame-driving means operable synchronously with the rotation of said drum to reciprocate said frame and mounted sheet longitudinally of said aperture to produce a scanning motion thereby over said subject a line at a time at a linear rate less than but in direct proportion to the linear rate of the sweeping motion of said beam over said drum, and second frame-driving means operable synchronously with said relative axial motion to impart to said frame and mounted sheet a motion transverse of said aperture at a rate less than said axial motion and in the same direct proportion thereto as that between said scanning and sweeping motions.

3. In a facsimile system in which a visual subject on a sheet is scanned by an aperture to thereafter be reproduced by a variable intensity light beam as photocopy on photosensitive film mounted on a drum which rotates and axially moves relative to said beam to produce by said rotation a sweeping by said beam a line at a time over said film, and to produce by said relative axial movement an axial motion of said beam over said film so as to space apart successive ones of said line sweepings, the improvement comprising, a frame adapted to mount said sheet in the field of view of said aperture, said frame being mounted independently of said drum to be movable relative thereto in directions longitudinally of and transverse of said aperture, a first mechanical linkage driven by the rotational motion characterizing said drum to reciprocate said frame and mounted sheet longitudinally of said aperture to produce a scanning motion thereby over said subject a line at a time, said scanning motion corresponding to the sweeping motion of said beam over said film, and a second mechanical linkage driven by said relative axial motion to move said frame and mounted sheet transversely of said aperture in correspondence with the axial motion of said beam over said film.

4. In a facsimile system in which a visual subject on a sheet is scanned by an aperture to thereafter be reproduced by a variable intensity light beam as photocopy on photosensitive film mounted on a drum which rotates and axially moves relative to said beam to produce by said rotation a sweeping by said beam a line at a time over said film, and to produce by said relative axial movement an axial motion of said beam over said film so as to space apart successive ones of said line sweepings the improvement comprising, a frame adapted to mount in the field of view of said aperture a sheet having thereon a visual subject to be reproduced to a larger scale as photocopy, said frame being mounted independently of said drum to be movable relative thereto in directions longitudinal of and transverse of said aperture, a first mechanical linkage driven by the rotational motion of said drum to reciprocate said frame and mounted sheet longitudinally of said aperture to produce a scanning motion thereby over said subject a line at a time at a linear rate less than but in direct proportion to that of the sweeping of said beam over said film and a second mechanical linkage driven by said relative axial motion to impart to said frame and mounted sheet a motion transverse of said aperture at a linear rate less than said axial motion and in the same direct proportion thereto as that between said scanning and sweeping motions.

5. In a facsimile system in which a visual subject on a sheet is scanned by an aperture to thereafter be reproduced by a variable intensity light beam as photocopy on a photosensitive film mounted on a drum which rotates and axially moves relative to said beam to produce by said rotation a sweeping by said beam a line at a time over said film, and to produce by said relative axial movement an axial motion of said beam over said film so as to space apart successive ones of said sweepings the improvement comprising, a pivoted frame adapted to mount said sheet in the field of view of said aperture and to undergo reciprocating motion about its pivot so as to produce a longitudinal scanning motion of said aperture over the subject on said sheet a line at a time and in correspondence with the sweeping motion of said beam, a transversely movable carriage for said pivoted frame, a first mechanical linkage coordinating the motions of said drum and frame to translate the rotational motion characterizing the former into a synchronous reciprocating motion of the latter while permitting transverse movement of said carriage and frame relative to said drum, and a second mechanical linkage responsive to said relative axial motion between said drum source to move said carriage and the frame and sheet thereon transversely of said aperture in correspondence with the axial motion of said beam over said film.

6. The improvement as in claim 5 in which said first linkage comprises an axially stationary cam adapted to rotate with said drum, a slide bar adapted to be rocked at right angles to its axis, means coupling said bar to said frame to translate the rocking of said bar into said reciprocating motion of said frame, and a push bar driven by said cam to rock said slide bar through a coupling between said push bar and slide bar permitting axial movement thereof independent of the rocking motion imparted thereto by said push bar.

7. The improvement as in claim 5 comprising direction reversing spring means adapted during only a terminal portion of the travel in reciprocation of said frame to alternately receive energy from and supply energy to said first mechanical linkage.

8. The improvement as in claim 5 in which said drum is axially stationary, a carriage for the source of said light beam is axially movable to produce said axial motion of said beam over said film, and in which said second mechanical linkage is connected between said carriage for said source and said carriage for said frame to transversely move the latter in direct proportion to the axial motion of the former.

9. In a facsimile system in which a visual subject on a sheet is scanned by an aperture to thereafter be reproduced as photocopy on photosensitive film mounted on an axially stationary, rotating drum by a variable intensity light beam from a source on a carriage which moves axially to produce axial motion of said beam relative to said film while said beam is caused by the rotation of said drum to undergo a sweeping a line at a time over said film, the improvement comprising, a pivoted frame adapted to mount said sheet in the field of view of said aperture and to undergo reciprocating motion about its pivot so as to produce a longitudinal scanning motion of said aperture over the subject on said sheet a line at a time and in correspondence with the sweeping motion of said beam, a transversely movable carriage for said pivoted frame, an axially stationary cam adapted to rotate with said drum, a slide bar adapted to be rocked at right angles to its axis, means coupling said slide bar to said frame to translate the rocking of said bar into said reciprocating motion of said frame, a push bar driven by said cam to rock said slide bar through a coupling between said push bar and slide bar permitting axial movement thereof independent of the rocking motion imparted thereto by said push bar, and a sine bar linkage connected between said carriage for said source and said carriage for said frame to transversely move the latter in correspondence with the axial motion of the former.

10. In a facsimile system in which a visual subject on a sheet is scanned by an aperture to thereafter be reproduced by a variable intensity light beam as photocopy on photosensitive film mounted on a drum which rotates and axially moves relative to said beam to produce by said rotation a sweeping by said beam a line at a time over said film, and to produce by said relative movement an axial motion of said beam over said film so as to space apart successive ones of said line traversings, the improvement comprising, means to mount said sheet in the field of view of said aperture, said sheet-mounting means being mounted independently of said drum to be movable relative thereto in directions longitudinal of and transverse of said aperture, and said mounting means imparting to said sheet a surface configuration whereby the longitudinal extent of the subject on said sheet subtends a smaller angle of arc than that subtended on said drum by the circumferential extent of the reproduced photocopy of said subject, and means to move said mounting means longitudinally and transversely relative to said aperture in synchronism with and at linear rates in direct proportion to, respectively, the rotational linear rates of the relative axial motions of said drum to produce a scanning by said aperture over said subject in a pattern of the same shape as the pattern of motions of said beam over said film.

11. In a facsimile system in which a visual subject on a sheet is scanned by an aperture to thereafter be reproduced by a variable intensity light beam as photocopy on photosensitive film mounted on a drum which rotates and axially moves relative to said beam to produce by said rotation a sweeping by said beam a line at a time over said film, and to produce by said relative axial movement an axial motion of said beam over said drum so as to space apart successive ones of said sweepings, the improvement comprising, a frame having longitudinally curved, transversely spaced side members adapted to grip transversely opposite edges of said sheet and to impart a longitudinal curvature thereto, said frame being mounted independently of said drum to be movable relative thereto in directions longitudinal of and transverse of said aperture, means included in said frame to spread said members so as to transversely stretch said gripped sheet, and means to move said frame longitudinally and transversely relative to said aperture in synchronism with and at linear rates in direct proportion to, respectively, the linear rates of rotational and relative axial motions of said drum to produce a scanning by said aperture over said subject in a pattern of the same shape as the pattern of motions of said beam over said film.

References Cited in the file of this patent
UNITED STATES PATENTS

| | | |
|---|---|---|
| 1,855,370 | Trenor | Apr. 26, 1932 |
| 1,914,258 | Howey | June 13, 1933 |
| 2,976,355 | Levine | Mar. 21, 1961 |